Dec. 29, 1970  W. B. HULLHORST  3,550,287
FILTER CONVEYOR
Filed April 4, 1968  2 Sheets-Sheet 1

INVENTOR.
WILLIAM B. HULLHORST
BY
Staelin & Overman
ATTORNEYS

Dec. 29, 1970  W. B. HULLHORST  3,550,287
FILTER CONVEYOR
Filed April 4, 1968  2 Sheets-Sheet 2
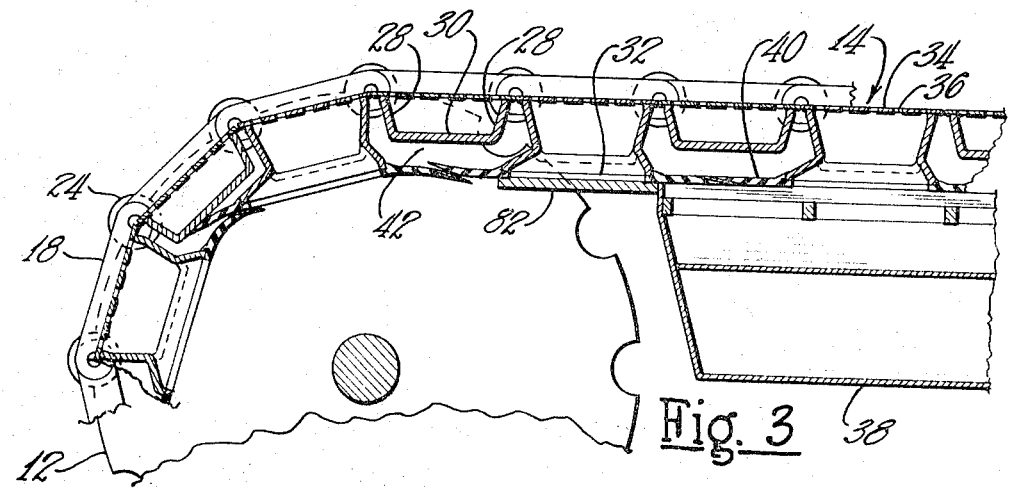
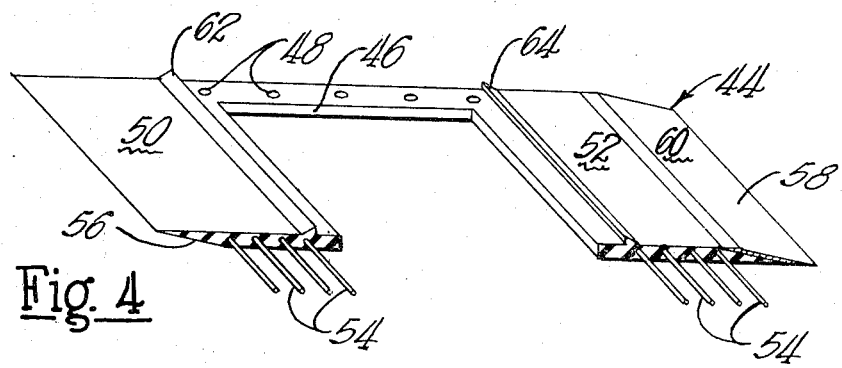
INVENTOR.
WILLIAM B. HULLHORST
BY
Staelin & Overman
ATTORNEYS

# United States Patent Office 3,550,287
Patented Dec. 29, 1970

3,550,287
FILTER CONVEYOR
William B. Hullhorst, Granville, Ohio, assignor to Owens-Corning Fiberglas Corporation, a corporation of Delaware
Filed Apr. 4, 1968, Ser. No. 718,768
Int. Cl. F26b 19/00
U.S. Cl. 34—236                                                           16 Claims

ABSTRACT OF THE DISCLOSURE

A conveyor having generally parallel flights arranged in side by side relationship. The flights are supported in such manner that the adjacent top edges of the flights do not separate when the flights round the head or tail pulleys. A suction chamber is positioned beneath the top run of the flights, and the bottom of the flights are provided with valving means which runs longitudinally of the flights and extends over an opening in the suction box. Alternate runs of the conveyor flights have openings in their bottom surfaces which communicate through the valving means to communicate vacuum to the top surfaces of the flights when the flights are positioned over the opening in the suction box. The portions of the sealing means between conveyor flights are arranged to foreshorten when rounding the head or tail pulleys and still seal when passing over the suction box. In the preferred arrangement, the bottom surface of those flights to which the valving means is not attached, is positioned upwardly from the plane of the valving means to accommodate buckling movement of the sealing means when rounding the head or tail pulleys. In the preferred embodiment, the sealing means is formed of sections having tapered leading and trailing edges which overlap with the tapered edges of adjacent sections. The trailing tapered edge faces upwardly and is provided with a metal plate which gives smooth sealing support to the leading edge of the adjacent section. Parallel stiffener rods are embedded in the sections adjacent the tapered edges to prevent sagging transversely of the opening in the suction box while allowing vertical flexure during movement around the head and tail pulleys.

BACKGROUND OF THE INVENTION

The present invention relates to a conveyor for removing liquids from solids transported by the conveyor, and which will cause a flow of gases either upwardly or downwardly through the solids on the conveyor. Because of its versatility, the conveyor will have many uses. In one use of the conveyor, mats of glass fibers saturated with a liquid are pressed down upon the surface of the conveyor, and heated air is pulled downwardly through the mat to strip unwanted liquid from the mat. In another use of the conveyor, mat having a desired level of remaining liquid binder is subjected to an upward flow of air through the conveyor to reduce the density or "fluff-up" of the mat. Similarly, granular solids can be stripped of liquids and be dried or "fluffed-up." Alternatively, solids can be effectively saturated with liquids by causing a liquid to be pulled downwardly uniformly through the bed of solids resting on the surface of the conveyor.

The principal object of the present invention, therefore, is the provision of a new and improved conveyor which will move gases or liquids either downwardly or upwardly through solids carried on the top surface of the conveyor.

Still other uses and/or adaptations will occur to those skilled in the art of the invention.

SUMMARY OF THE INVENTION

According to the invention, there is provided a conveyor comprising a plurality of conveyor flights positioned side by side to form an endless conveyor which rounds both head and tail pulleys. A plenum chamber is positioned beneath a top flight. The plenum chamber may be supplied with either positive or negative pressures, to either force fluids upwardly through material transported on top of the conveyor flights, or pull fluids downwardly through material supported on top of the flights. Valving means is attached to the bottoms of the conveyor flights to effect a seal between the plenum chamber and the individual flights. The individual flights are supported upwardly from the valving means, and in the preferred embodiment, are supported by rollers the axis of which are in the plane of the top surface of the flights. The rollers of the preferred embodiment are also preferably positioned in line with the adjacent top side edges of the flights so that these adjacent top edges do not separate when the flights move around the head and tail pulleys. With this arrangement, the valving means which is positioned at the bottom of the flights must foreshorten as the flights round the head and tail pulleys. According to the invention, two laterally spaced plenum chambers are provided and alternate conveyor flights are provided with openings for communication with one of the plenum chambers while the bottoms of the other conveyor flights are elevated above the plane of the valving means to provide space into which the valving means can move. The valving means comprises a flexible material which surrounds the bottom openings of the conveyor flights and otherwise forms a continuous band which seals off the top of the plenum chamber. In the preferred embodiment, the valve means is made in a plurality of sections. Each section is made from molded rubber or other elastomeric material and has tapered leading and trailing edges. The taper on the leading edge faces downwardly while the taper on the trailing edge faces upwardly to provide a sliding seal with respect to the leading edge of the succeeding section. The tapered leading and trailing surfaces, therefore, are free to slide over the top of each other as the valving sections traverse the head and tail pulleys. The sections are suitably stiffened by sliding over the top surface of the plenum chamber. The top valving surfaces of the plenum chamber is made of rectangularly shaped tubing having openings in its top surface to distribute lubricant between the sliding surfaces of the plenum chamber and valving means.

DESCRIPTION OF THE DRAWINGS

FIG. 3 is a fragmentary sectional view showing the manner in which the flights of the conveyor round the head sprockets; and FIG. 4 is a fragmentary isometric view of one element of the valving means used to effect a seal between the plenum chamber and the individual flights.

DESCRIPTION OF THE PREFERRED EMBODIMENTS

Figure 1:
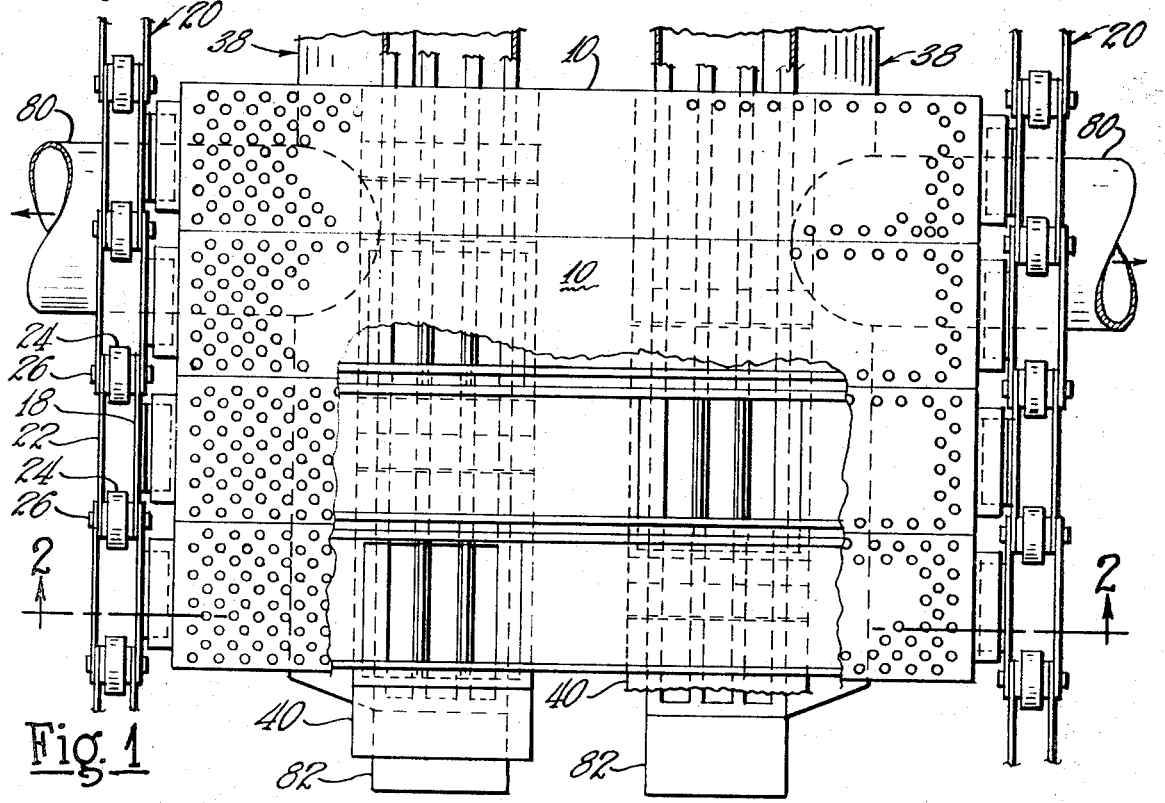
FIG. 1 is a fragmentary plan view of a portion of the conveyor of the present invention.
Figure 2:
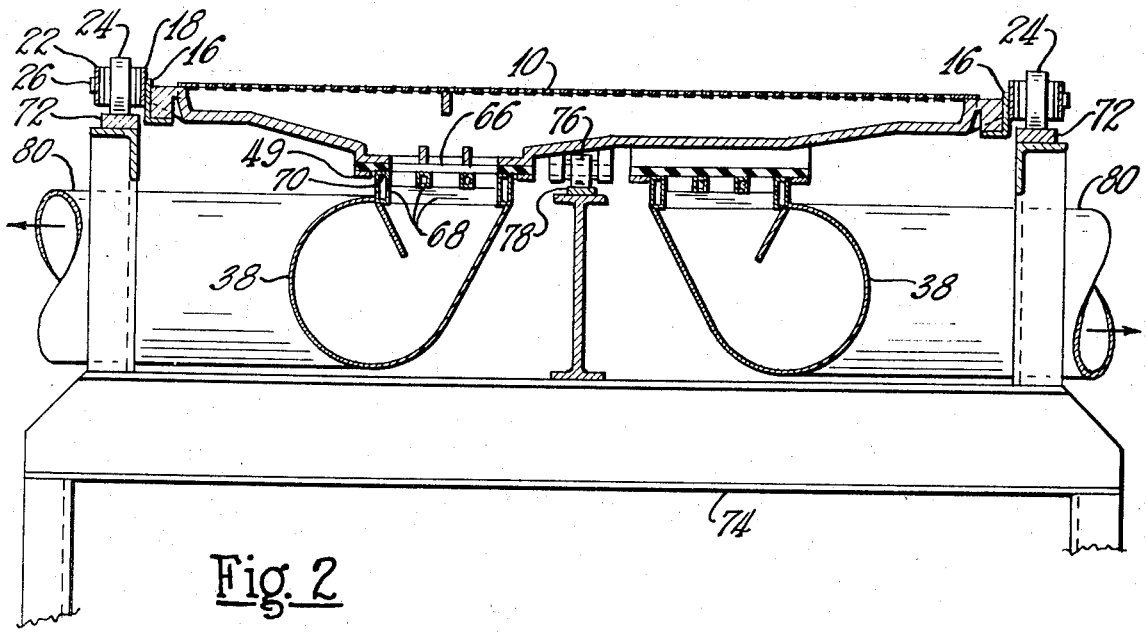
FIG. 2 is a fragmentary sectional view taken approximately on the line 2—2 of FIG. 1.

The apparatus shown in the drawings generally comprises a plurality of parallel flights 10 connected together in side by side relationship in endless fashion to form an endless conveyor. The endless conveyor includes a head sprocket 12 and tail sprocket, not shown, around which the parallel flights move, and between which the flights move in a forwardly moving top run 14, and bottom return run, not shown. The parallel flights 10 may be supported and moved in any suitable fashion, and while it may not be necessary in all instances, the top edges of the parallel flights 10 are held in touching engagement during at least the forward run of the flights. In the embodiment shown in the drawings, the side surfaces of the parallel flights 10 are tapered toward their bottom surfaces, and the flights are so supported that the top edges remain in engagement during travel around the head pulley 12 and tail pulley not shown. In the embodiment shown in the drawing, each end of the flights 10 are received in an L-shaped bracket 16 which in turn is secured to the inside connecting link 18 of a respective one of a pair of roller chains 20. The roller chains 20 include outer connecting links 22 and inner links 18, which are spaced apart in conventional fashion by rollers 24. The links 18 and 22 are connected to the rollers 24 at their opposite ends, and to the ends of succeeding pairs of links 18 and 22 by roller support pins 26. In the embodiment shown in the drawing, the pins 26 are coextensive with the top corners of the flights 10, so that the adjacent top side edges of the flights are in effect pivoted or hinged about the axis of the pins 26. This assures that the top side edges of the flights 10 are held in close engagement while traversing the top run of the conveyor, and also while traversing the head and tail pulleys. Inasmuch as the top corners of the flights 10 are in effect hinged at their juncture, the bottoms of the flights 10 must converge during traverse of the head and tail pulleys, and this converging movement is accommodated by the tapered sides 28 of the flights which provide the necessary clearance between adjacent flights.

The flights 10 have bottoms 30 which are closed except for an opening 32 whose purpose will later be explained. The top surface of the flights is formed by a generally flat plate 34 having openings or perforations 36 therein for producing uniform liquid fluid flow through materials supported on the top surface of the conveyor. Fluid flow through the perforations 36 is initiated and controlled by the fluid pressure within the plenum chambers 38 positioned beneath the top run 14 of the conveyor. The plenum chambers 38 extend lengthwise of the top run 14, and communication between the plenum chambers and each of the flights 10 is controlled by a pair of valving means 40 which extend in continuous manner around the flights and which are secured to the bottom surfaces of alternate flights 10. In those instances where the flights are pivotly supported in a plane generally coextensive with the valving means 10, no substantial foreshortening of the continuous valve means will take place during the traverse of the head and tail pulleys. In the embodiment shown in the drawing, however, the bottom surfaces of the flights are caused to converge, and a foreshortening of the valving means takes place during the traverse of the head and tail pulleys. This foreshortening is accommodated in the embodiment shown in the drawings, by staggering the openings 32 in the bottom of the flights so that only alternate flights communicate with a particular plenum chamber 38. The portion of the bottoms of the remaining flights which pass over the particular plenum chamber are elevated to provide clearance 42 for receiving a buckling action of the valving means 40. The remaining flights 10 are of opposite hand, so that their openings 32 traverse a different path which extends over a plenum chamber 38 spaced laterally from the first described plenum chamber. Inasmuch as the clearance 42 extends for the full width of a flight, it will accommodate a considerable amount of foreshortening of the valve means, so that in some instances, the valve means may be a continuous sheet of flexible material which bows up into the space 42. In the preferred embodiments shown in the drawings, however, the valve means 40 is split beneath the space 42 so that portions of the seal on opposite sides of the slit may ride over each other to accommodate the necessary foreshortening movement.

The valve means of the preferred embodiment shown in the drawings generally comprises a plurality of flexible sections 44 arranged end to end to form the continuous sealing means. Each section 44 has a central opening 46 therethrough which matches the opening 32 in the bottom flight, and each section 44 is fastened to the bottom of a flight by suitable means which aligns the openings 46 and 32. In the embodiment shown in the drawing, a plurality of bolt receiving openings 48 are provided and machine screws not shown, extend through the bolt openings 48 and hold down bars 49 and are threaded into the bottom of the conveyor flights 10. The sections 44 are identical and include a leading portion 50 and a trailing portion 52. The sections 44 are molded of rubber or other elastomeric material and the leading and trailing portions 50 and 52 are preferably stiffened by having parallel rods 54 molded therein to permit vertical flexing, but prevent sagging. The leading edge of section 44 is feathered or tapered to provide a downwardly facing surface 56, and the trailing edge of the trailing portion 52 is correspondingly tapered or feathered to provide an upwardly facing surface 58 for receiving the downwardly facing surface 56 of a trailing section 44. In the preferred embodiment, the upwardly facing surface 58 is formed by a metal plate 60 that is molded in place or otherwise affixed to trailing portion 52 of the section. Metal plate 60 forms a smooth stiff surface for the flexible downwardly facing surface 56 to seal against. Section 44 also includes lips 62 and 64 on its top surface adapted to engage the bottom surfaces of the flight which surrounds the opening 32 to facilitate a seal therewith.

In the embodiment shown in the drawings, the plenum chambers 38 are communicated with vacuum, and in effect are suction boxes. The valving means 40, therefore, is pulled down upon the top valving surface 66 of the plenum chamber 38 with considerable force, so that lubrication between the valving means 40 and the valving surface 66 is highly desirable. In the embodiment shown in the drawings, the valving surface 66 is formed by means of retangularly shaped tubular members 68 which are welded into a frame that is welded to the top of the plenum chambers 38. The internal passage of the tubular members 68 communicate with each other and are supplied with fluid under pressure, by means not shown. The fluid flows up through openings 70 in the top wall of the tubing to lubricate the valving surface 66 on which the valving means 40 slides. The rollers 24 of each roller chain 20 ride upon identical but opposite hand rails 72 which in turn are carried by the frame 74 of the conveyor. Air pressure on the top surface of the flights 10 creates a considerable downward force, and each flight 10 is provided with a center roller 76 that is journaled in the plane of the valving surface 66 to prevent undue flexing of the valving means 40. The rollers 76 are positioned in between the two plenum chambers 38, and roll upon a third rail 76 that is also supported from the same frame 74 of the conveyor. Because portions of the frame 74 run longitudinally between the plenum chambers, each plenum chamber 38 is communicated with a vacuum source by separate lateral conduits 80.

During operation, either a suction fan or blower is communicated to the lateral conduits 80 to supply the desired direction of gas flow through the materials on top of the conveyor. One of the head or tail pulleys is driven by power means not shown, and the driven sprocket contains projections which extend between the links 18 and 22 to engage and drive the rollers 24. In the embodiment shown, the flights 10 are moved to the left, as seen in FIG. 3, to slide the valve means 40 lengthwise over the valving surfaces 66 of the plenum chambers 38. Water or other suitable lubricant under pressure is forced through the tube 68 and out through the openings 70 to lubricate the valving surfaces and reduce friction therebetween. In the embodiment shown, vacuum is supplied to the plenum chambers 38 so that the leading portions 50 of one section 44 of the valving means 40 is pulled downwardly upon the plate 60 of the trailing section 52 of the preceding section 44. While over the plenum chamber 38, therefore, the sections 44 seal with respect to each other. Side portions of the seal slide over the tubings which surround the opening of the plenum chamber to close off the plenum chamber except for communication with the openings 32 positioned over the plenum chamber. Air, therefore, is pulled downwardly through the materials supported on the top surface 34 of the flights to pass through the openings 36 and 32 into the plenum chamber. The ends of the plenum chamber are effectively sealed, by flat continuation plates 82, which extend beyond the openings of the plenum chambers by a distance greater than the width of the openings 32. Because the flights are effectively hinged about the axis of the rollers 26 at a location coincident with the adjacent top edges of the flights, the adjacent top edges remain together continuously even during traverse of the head and tail sprockets. During traverse of the head and tail sprockets, the lower portions of the flights converge, and in the embodiment shown in the drawing, the leading portion 50 of one section 44 of the valve means 40 slides forwardly over the trailing portion 52 of the preceding valve section 44 to accommodate this converging movement. When the flights again assume normal straight line motion, the trailing portion 50 slides back over the sealing plate 60 of the trailing portion 52 of the preceding flight to again establish a seal therebetween. Water or other liquid that is in the material on top of the conveyor is sucked down into the plenum chamber 38 and runs to a low spot in the system where it is drained off and recirculated or disposed of as may be desired.

In some instances it will be desired to blow air or other gases upwardly through the material on the top flight of the conveyor, and in this instance, the plate 60 may be attached to the bottom of the leading portion 50 to give the desired rigidity against pressure in an upward direction, and the leading portion 50 can be supported from above to prevent vertical movement at least while over the plenum chamber.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:

1. A conveyor comprising: a plurality of conveyor flights in side by side relationship, means for advancing said flights in a predetermined path, a plenum chamber positioned beneath said predetermined path of said flights, said plenum chamber having an opening in its upper surface, valving means extending along said predetermined path over said opening of said plenum chamber, alternate ones of said flights having openings communicating with said valving means and around which said valving means is attached to said flights, and the remaining ones of said flights having bottom portions which pass over said opening of said plenum chamber and which are spaced vertically therefrom to accommodate flexure of said valving means intermediate areas of attachment to said alternate flights, and said valving means being flexible and foreshortenable in the regions between attachment to the flights to accommodate movement of the bottom of said flights toward each other.

2. The conveyor of claim 1 wherein the axes of rotation of said rollers are positioned approximately in the plane of the upper surface of said flights.

3. The conveyor of claim 2 wherein said flights are supported and moved by roller chains positioned at opposite ends of said flights with the axes of rotation of the rollers being positioned intermediate adjacent flights.

4. The conveyor of claim 1 wherein said valving means is formed of a plurality of abutting sections with abutting end portions of said sections being tapered and overlapping.

5. The conveyor of claim 4 wherein said sections of said valving means are unidirectionally reinforced against flexure between attachment to said flights and in a direction generally parallel to the sides of said flights.

6. The conveyor of claim 5 wherein the underlying tapered surface of said sections of said sealing means is faced with a metal plate.

7. A flexible valve plate comprising: a sheet of an elastomeric material having a generally centrally located opening therethrough and having oppositely projecting, leading and trailing portions, said leading portion having a leading surface side edge tapered to provide a surface facing downwardly, and said trailing portion having a trailing surface correspondingly tapered to provide a matching surface facing upwardly, and said elastomeric material having stiffeners embedded therein paralleling said tapered surfaces.

8. The flexible valve plate of claim 7 wherein said upwardly facing trailing side is faced with a stiffening plate.

9. Apparatus comprising: a plurality of aligned conveyor flights arranged for movement in the direction of alignment, a plurality of flexible valve plates attached to predetermined spaced apart ones of said flights and in aligned sealing engagement with each other to provide a contiguous external sealing surface of a predetermined configuration crosswise to said direction of alignment, each of said valve plates having a portion projecting in the direction of alignment from its attachment to its supporting flight and which is supported against flexure crosswise of said direction of alignment, said valve plates being flexible along a direction extending at right angles to its sealing surface, said flights being supported at locations outside of said sealing surface to produce a reduction in spacing between flights to which adjacent valve plates are attached and a foreshortening of valve plate portions between flights, and said flights between said spaced apart flights being recessed from said sealing surface to accommodate said foreshortening of said valve plates.

10. The apparatus of claim 9 in which respective valve plates are attached to the bottom of alternate flights, with the bottom of inbetween flights being spaced upwardly from said sealing surface.

11. The apparatus of claim 9 having two parallel rows of aligned valve plates forming two parallel sealing surfaces, with consecutive valve plates in one row being attached to alternate conveyor flights and the valve plates of the other row being fixed to inbetween conveyor flights.

12. The apparatus of claim 11 in which the surfaces of said conveyor flights slope away from the planes of said sealing surfaces to provide said recess means.

13. The apparatus of claim 12 in which said apparatus has a longitudinal centerline between said sealing surfaces, and all of said flights being identical with adjacent flights being positioned end for end relative to each other.

14. Apparatus comprising: a plurality of aligned conveyor flights arranged for movement in the direction of alignment, a fluid duct having an opening therein past which said conveyor flights move, a plurality of flexible valve plates respective ones of which are attached to respective ones of said flights in aligned sealing engagement with each other to provide a contiguous substantially fluid tight external sealing surface carried by said flights and having sliding sealing engagement with the portion of said fluid duct surrounding said opening therein, each of said valve plates having a portion projecting in the direction of alignment from its attachment to its supporting flight and which is supported against flexure crosswise of said direction of alignment and being flexible along a direction extending at right angles to its sealing surface, said flights being supported at locations outside of said sealing surface to produce a reduction in spacing between flights to which adjacent valve plates are attached and a foreshortening of valve plate portions between flights, and recess means in said flights accommodating said aforeshortening of said valve plates.

15. The apparatus of claim 14 wherein said opening is surrounded by hollow rectangularly shaped tubing fabricated to form a planar outer surface for sliding sealing engagement with said flexible valve plates, said hollow rectangularly shaped conduit being supplied with a lubricant for said valve plates and having openings communicating with the planar surface engaged by said valve plates.

16. The apparatus of claim 15 wherein the abutting edges of said valve plates are tapered, and said apparatus including means stiffening one tapered edge for supporting the abutting tapered edge.

References Cited
UNITED STATES PATENTS

| | | | |
|---|---|---|---|
| 647,750 | 4/1900 | Hunt | 198—149 |
| 2,862,308 | 12/1958 | Meredith et al. | 34—236 |
| 3,381,796 | 5/1968 | Gregor | 198—149X |
| 2,101,042 | 12/1937 | Casey | 34—236X |
| 2,101,109 | 12/1937 | Thompson | 34—236X |
| 2,336,698 | 12/1943 | Morrill | 34—236UX |
| 3,161,485 | 12/1964 | Buhrer | 34—236 |
| 3,359,648 | 12/1967 | Overly et al. | 34—162 |

FREDERICK L. MATTESON, JR., Primary Examiner

H. B. RAMEY, Assistant Examiner